United States Patent
Hanczor et al.

(10) Patent No.: US 12,232,095 B2
(45) Date of Patent: Feb. 18, 2025

(54) ULTRA-WIDEBAND RADIO SYSTEM WITH DETECT-AND-AVOID CAPABILITY

(71) Applicant: Piper Networks, Inc., San Diego, CA (US)

(72) Inventors: Robert Hanczor, San Diego, CA (US); Duane Maxwell, San Diego, CA (US); Sai Kwok, San Diego, CA (US)

(*) Notice: Subject to any disclaimer, the term of this patent is extended or adjusted under 35 U.S.C. 154(b) by 325 days.

(21) Appl. No.: 17/316,360

(22) Filed: May 10, 2021

(65) Prior Publication Data

US 2021/0410141 A1  Dec. 30, 2021

Related U.S. Application Data

(60) Provisional application No. 63/022,150, filed on May 8, 2020.

(51) Int. Cl.
*H01Q 5/25* (2015.01)
*H01Q 1/28* (2006.01)
*H04W 72/0453* (2023.01)

(52) U.S. Cl.
CPC .......... *H04W 72/0453* (2013.01); *H01Q 1/28* (2013.01); *H01Q 5/25* (2015.01)

(58) Field of Classification Search
CPC ......... H04W 72/0453; H04W 52/0229; H04W 52/0235; H01Q 1/28; H01Q 5/25; G01S 11/06; G01S 7/0232; G01S 13/0209; H04B 11/00; G06F 3/167; G06F 9/4418; Y02D 30/70; G10L 15/22; G10L 15/02; G10L 2015/223
See application file for complete search history.

(56) References Cited

U.S. PATENT DOCUMENTS

| | | | | |
|---|---|---|---|---|
| 6,161,070 | A * | 12/2000 | Jinno | B60R 21/01532 701/45 |
| 11,024,105 | B1 * | 6/2021 | Brand | G06K 7/10366 |
| 2004/0008617 | A1 * | 1/2004 | Dabak | H04L 5/0062 370/208 |
| 2007/0259690 | A1 * | 11/2007 | Julian | H04W 8/02 455/557 |
| 2007/0273575 | A1 | 11/2007 | Yang et al. | |
| 2008/0234930 | A1 | 9/2008 | Cheok et al. | |
| 2009/0054080 | A1 * | 2/2009 | Kottke | G01S 3/10 455/456.1 |
| 2009/0262010 | A1 | 10/2009 | Kwak et al. | |

(Continued)

OTHER PUBLICATIONS

International Search Report and Written Opinion in PCT/US2021/031604, dated Aug. 23, 2021.

(Continued)

*Primary Examiner* — Jay P Patel
*Assistant Examiner* — Shehab A Alawdi
(74) *Attorney, Agent, or Firm* — Gavrilovich, Dodd & Lindsey LLP

(57) ABSTRACT

In general, one aspect disclosed features an apparatus comprising: an ultra-wideband (UWB) radio configured to transmit a UWB radio signal in a frequency band; a detect circuit configured to monitor the frequency band for the presence of a second radio signal in the frequency band; and a controller configured to cause the UWB radio to transmit the UWB signal responsive to the detect circuit detecting the presence of the second radio signal in the frequency band.

14 Claims, 6 Drawing Sheets

(56) References Cited

U.S. PATENT DOCUMENTS

| | | | |
|---|---|---|---|
| 2010/0118785 A1* | 5/2010 | Sugaya | H04W 74/0816 |
| | | | 370/328 |
| 2010/0272012 A1 | 10/2010 | Knefelkamp et al. | |
| 2011/0012729 A1* | 1/2011 | Hess | G08B 13/1445 |
| | | | 340/539.11 |
| 2012/0300866 A1* | 11/2012 | Muralidhar | H04L 27/122 |
| | | | 375/299 |
| 2013/0152168 A1* | 6/2013 | Nasir | H04W 12/64 |
| | | | 726/4 |
| 2014/0044152 A1 | 2/2014 | Park | |
| 2018/0341014 A1* | 11/2018 | Pesik | B64U 60/50 |
| 2020/0249070 A1* | 8/2020 | Gurumohan | G01F 23/804 |

OTHER PUBLICATIONS

International Preliminary Report on Patentability for Application No. PCT/US2021/031604, mailed on Nov. 17, 2022, 10 pages.

* cited by examiner

ULTRA-WIDEBAND RADIO SYSTEM WITH DETECT-AND-AVOID CAPABILITY

CROSS REFERENCE TO RELATED APPLICATIONS

The present application claims priority to U.S. Provisional Patent Application No. 63/022,150, filed May 8, 2020, entitled "Avoiding UWB Radio Interference with Rescue Helicopter Altimeters," the disclosure thereof incorporated by reference herein in its entirety.

DESCRIPTION OF RELATED ART

The disclosed technology relates generally to radio communications, and more particularly some embodiments relate to ultra-wideband radios.

SUMMARY

In general, one aspect disclosed features an apparatus comprising: an ultra-wideband (UWB) radio configured to transmit a UWB radio signal in a frequency band; a detect circuit configured to monitor the frequency band for the presence of a second radio signal in the frequency band; and a controller configured to cause the UWB radio to transmit the UWB signal responsive to the detect circuit detecting the presence of the second radio signal in the frequency band.

Embodiments of the apparatus may include one or more of the following features. In some embodiments, the detect circuit is configured to monitor the frequency band for the presence of a second radio signal in the frequency band by: calculating a distance to a source of the second radio signal; determining whether the calculated distance is less than a distance threshold; and detecting the second radio signal in the frequency band responsive to determining the calculated distance is less than the distance threshold. In some embodiments, the detect circuit is configured to monitor the frequency band for the presence of a second radio signal in the frequency band by: measuring a signal strength of the second radio signal; determining whether the measured signal strength is greater than a signal strength threshold; and detecting the second radio signal in the frequency band responsive to determining the measured signal strength is greater than the signal strength threshold. In some embodiments, the controller is further configured to cause the UWB radio to transmit the UWB signal responsive to not detecting the second radio in the frequency band. In some embodiments, the second signal is in the 4.2-4.4 GHz frequency band. In some embodiments, the second signal is a radio altimeter signal. Some embodiments comprise an antenna; and a directional coupler electrically coupled to the antenna, the UWB radio, and the detect circuit.

In general, one aspect disclosed features a method comprising: monitoring a frequency band for the presence of a second radio signal in the frequency band; and transmitting an ultra-wideband (UWB) radio signal in the frequency band only when the second radio signal is not present in the frequency band. Embodiments of the method may include one or more of the following features. In some embodiments, monitoring the frequency band for the presence of a second radio signal comprises: calculating a distance to a source of the second radio signal; determining whether the calculated distance is less than a distance threshold; and detecting the second radio signal in the frequency band responsive to determining the calculated distance is less than the distance threshold. In some embodiments, monitoring the frequency band for the presence of a second radio signal comprises: measuring a signal strength of the second radio signal; determining whether the measured signal strength is greater than a signal strength threshold; and detecting the second radio signal in the frequency band responsive to determining the measured signal strength is greater than the signal strength threshold. Some embodiments comprise resuming transmission of the UWB signal responsive to not detecting the second radio in the frequency band. In some embodiments, the second signal is in the 4.2-4.4 GHz frequency band. In some embodiments, the second signal is a radio altimeter signal.

In general, one aspect disclosed features a non-transitory machine-readable storage medium encoded with instructions executable by one or more hardware processors of a computing component, the machine-readable storage medium comprising instructions to cause the one or more hardware processors to perform operations comprising: receiving parameters of signals received in a frequency band of an ultra-wideband (UWB) radio signal transmitted by a UWB radio; monitoring the frequency band for the presence of a second radio signal based on the received parameters; and transmitting a UWB radio signal in the frequency band only when the second radio signal is not present in the frequency band.

Embodiments of the non-transitory machine-readable storage medium may include one or more of the following features. In some embodiments, monitoring the frequency band for the presence of a second radio signal comprises: calculating a distance to a source of the second radio signal based on the received parameters; determining whether the calculated distance is less than a distance threshold; and detecting the second radio signal in the frequency band responsive to determining the calculated distance is less than a distance threshold. In some embodiments, monitoring the frequency band for the presence of a second radio signal comprises: measuring a signal strength of the second radio signal; determining whether the measured signal strength is greater than a signal strength threshold; and detecting the second radio signal in the frequency band responsive to determining the measured signal strength is greater than the signal strength threshold. In some embodiments, the operations further comprise: causing transmission of the UWB signal to resume responsive to not detecting the second radio in the frequency band. In some embodiments, the second signal is in the 4.2-4.4 GHz frequency band. In some embodiments, the second signal is a radio altimeter signal.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Ultra-wideband (UWB) is a technology for transmitting information across a wide bandwidth, e.g., 200 MHz or more, which allows for the transmission of a large amount of signal energy without interfering with conventional narrowband and carrier wave transmission in the same frequency band. UWB technology has many applications, including radar imaging, sensor data collection, and precision location and tracking.

UWB technology shares spectrum with radio altimeters often used in rescue helicopters. For this reason, the United States Federal Communications Commission regulates the operation of fixed outdoor UWB radios so as not to interfere with such altimeters. Similar regulations exist in other countries.

Figure 1:
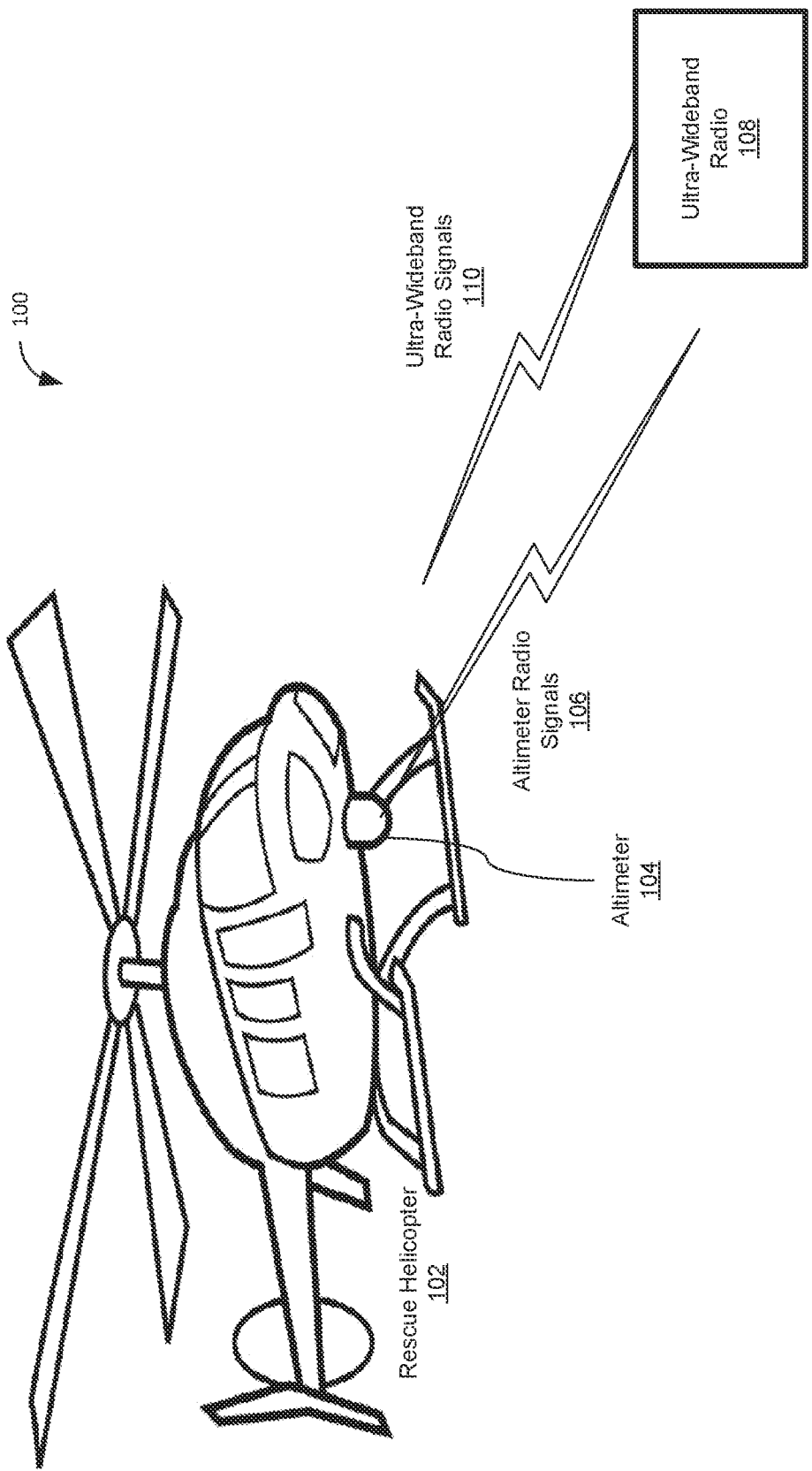
FIG. 1 illustrates an example scenario involving a rescue helicopter and a UWB radio.

FIG. 1 illustrates an example scenario 100 involving a rescue helicopter 102 and a UWB radio 108. The rescue helicopter 102 includes an altimeter 104 that transmits altimeter radio signals 106, receives reflections of those signals, and employs those signals and reflections to calculate the altitude of the rescue helicopter 102. The UWB radio 108 transmits UWB radio signals 110, and may receive UWB radio signals as well. Were the altimeter 104 to receive the UWB radio signals 110 at sufficient strength, the altitude calculations may be compromised. Under certain conditions where altitude readings are crucial, for example in low-visibility conditions, improper altitude readings could jeopardize the lives of the helicopter crew, as well as those of other people on the ground.

Embodiments of the disclosed technologies provide UWB radios that include detect-and-avoid circuits. Each detect-and-avoid circuit may monitor the frequency band of the UWB signal transmitted by the UWB radio for the presence of other signals that may have higher priority, referred to herein as "priority signals." In some embodiments, the priority signals include radio altimeter signals. In some embodiments, the priority signals include radio signals other than radio altimeter signals.

On detecting the presence of a priority signal within the frequency band of the UWB signal transmitted by the UWB radio, the detect-and-avoid circuit may cause the UWB radio to cease transmission of the UWB signal. In some embodiments, most of the circuits in the UWB radio system are broadband type. In these embodiments, response time is very fast, taking only microseconds.

Figure 2:
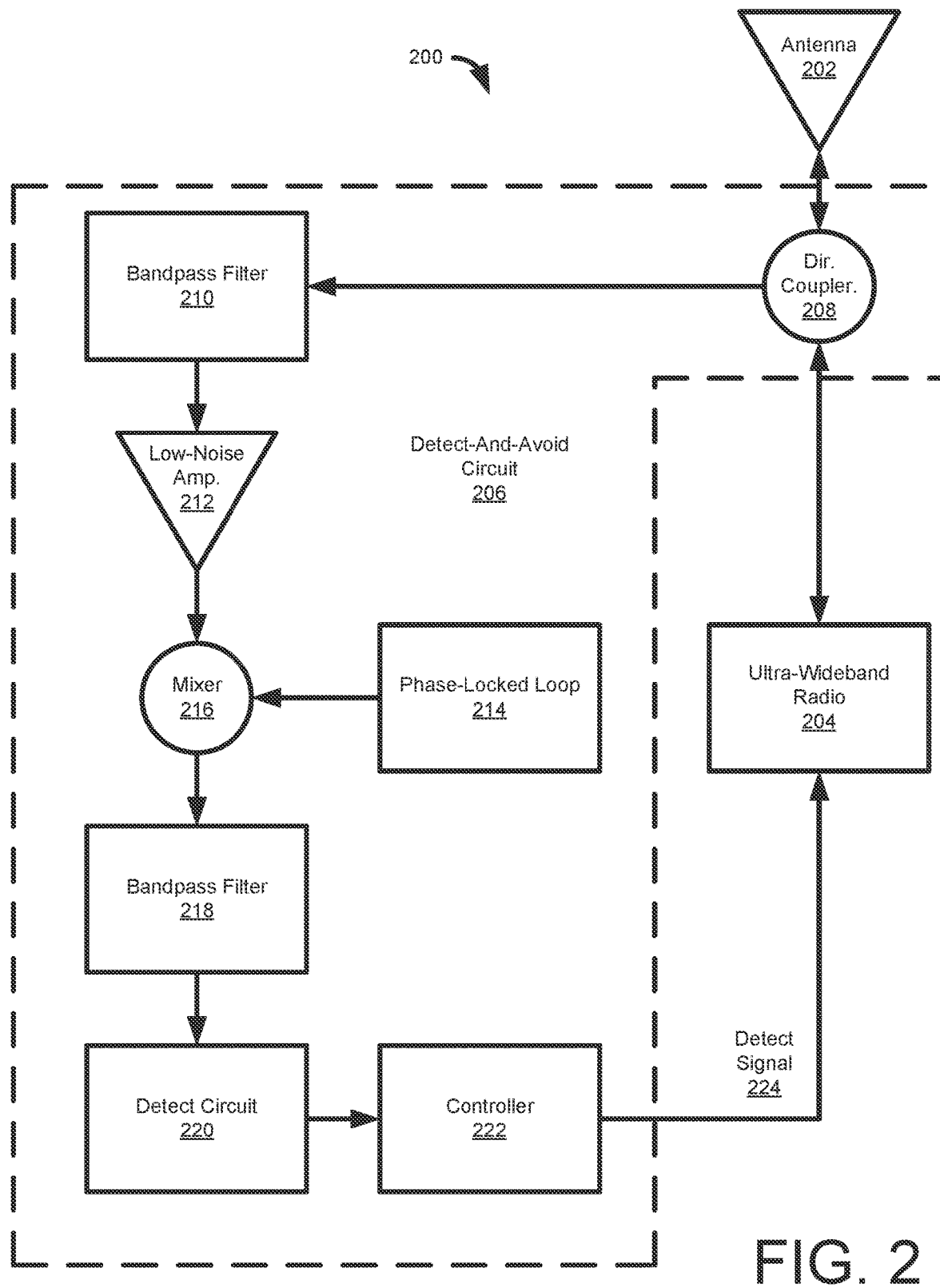
FIG. 2 is a block diagram of a UWB radio system according to some embodiments of the disclosed technologies.

FIG. 2 is a block diagram of a UWB radio system 200 according to some embodiments of the disclosed technologies. Although the elements of the UWB radio system 200 are presented in one arrangement, it should be understood by those skilled in the relevant arts that the elements may be arranged in other ways. For example, some or all of the functions of one element may be performed by one or more other elements. As another example, one or more elements may be omitted, and/or other elements added.

Referring to FIG. 2, the system 200 may include an antenna 202 and a UWB radio 204. These elements may be designed, fabricated, and operated in a conventional manner.

The system 200 also includes a detect-and-avoid (DAA) circuit 206. In the embodiment of FIG. 2, the UWB radio 204 and the DAA circuit 206 may share the antenna 202. In such embodiments, the DAA circuit 206 may include a directional coupler 208 to electrically couple the antenna 202 with the UWB radio 204 and the other elements of the DAA circuit 206. The directional values of the directional coupler 208 may be selected to provide sufficient sensitivity in the DAA circuit 206 without sacrificing performance of the UWB radio 204. In other embodiments, other devices may be used to electrically couple the antenna 202 with the UWB radio 204 and the other elements of the DAA circuit 206. For example, switches may be employed to selectively couple these elements.

In other embodiments, the UWB radio 204 and the DAA circuit 206 may not share an antenna. In such embodiments, the directional coupler 208 may not be needed.

The DAA circuit 206 may include a single conversion type radio. The DAA circuit 206 may include a bandpass filter 210 to avoid out-of-band interference by passing only signals in the frequency band of the UWB radio, or by passing only signals considered priority signals. For example, when the priority signal is a US radar altimeter signal operating in the 4.2-4.4 Ghz frequency band, the bandpass filter 210 may be configured to pass only signals in that band.

The DAA circuit 206 may include a low-noise amplifier 212. The low-noise amplifier 212 may be configured to amplify the signals passed by the bandpass filter 210. The low-noise amplifier 212 may be selected to provide a better than 10 dB overall noise figure and/or a better than −70 dBm sensitivity.

The DAA circuit 206 may downconvert the signal from radio frequency to intermediate frequency for further processing. The DAA circuit 206 may include a phase-locked loop (PLL) 214 configured to generate a PLL signal, and a mixer 216 to mix the output of the low-noise amplifier 212 with the PLL signal. The mixer 216 may be a broadband type with minimum intermodulation distortion that could degrade overall signal detection quality for the DAA circuit 206.

The DAA circuit 206 may include a further bandpass filter 218 to improve selectivity by passing only the desired band of the resulting intermediate-frequency signal. The center frequency of the intermediate-frequency filter may be chosen to provide good spurious rejection. In one example, the PLL frequency is 5865.5 MHz, and the center frequency of the bandpass filter 218 is 4.3 GHz−PLL frequency=1565.5 MHz. However, it should be understood by those skilled in the relevant arts that other values may be used.

The DAA circuit 206 may include a detect circuit 220 configured to detect the presence of priority signals in the frequency band of the UWB radio 204. The detect circuit 220 may measure one or more parameters for use in determining whether a priority signal is present. For example, these parameters may include signal strength and/or similar parameters. The detect circuit 220 may be a logarithmic type, and may have at least a 40 dB dynamic range. In some embodiments, the detect circuit 220 may scan the frequency band in discrete steps.

The DAA circuit 206 may include a controller 222. In some embodiments, the controller 222 may be implemented as described below with reference to FIG. 6. The output of the detect circuit 220 may be sampled by an analog-to-digital converter and fed into the controller 222. The controller 222 may be configured to determine whether a priority signal is present in the frequency band of the UWB radio 204. For example, the controller 222 may process one or more parameters generated by the detect circuit 220. These techniques may involve calculating one or more further parameters, and comparing the calculated parameters with corresponding predetermined thresholds. For example, these parameters may include a distance to the source of the priority signal, a signal strength of the priority signal, and/or similar parameters.

On detecting a priority signal is present in the frequency band of the UWB radio 204, the controller 222 may inform the UWB radio 204. For example, the controller 222 may assert a detect signal 224. Responsive to assertion of the detect signal 224, the UWB radio 204 may cease transmission. On detecting the priority signal is no longer present in the frequency band of the UWB radio 204, the controller 222 may negate the detect signal 224. Responsive to negation of the detect signal 224, the UWB radio 204 may resume transmission.

Figure 3:
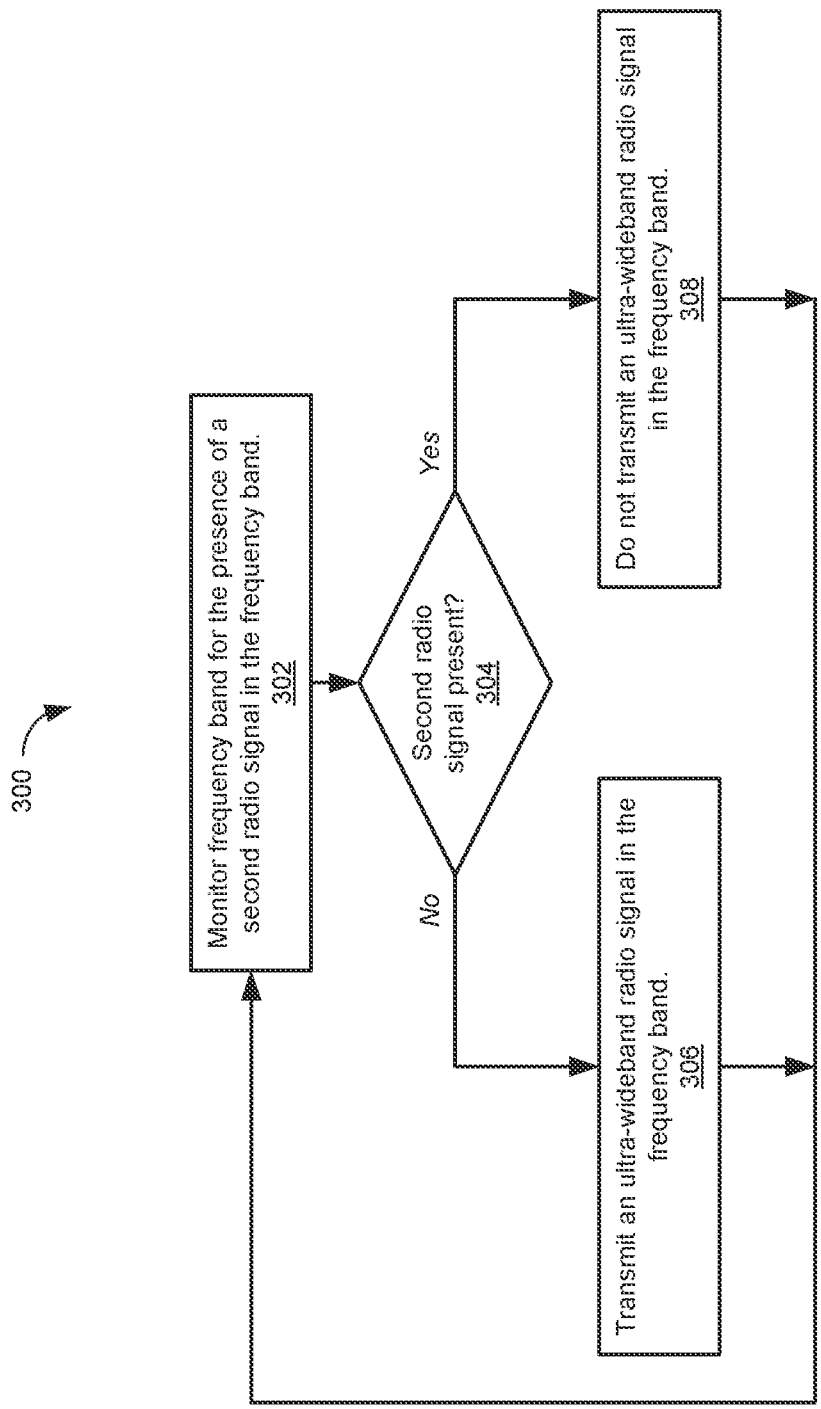
FIG. 3 is a flowchart illustrating a process for a UWB radio system that includes a DAA circuit according to some embodiments of the disclosed technologies.

FIG. 3 is a flowchart illustrating a process 300 for a UWB radio system that includes a DAA circuit according to some embodiments of the disclosed technologies. The elements of the process 300 are presented in one arrangement. However, it should be understood that one or more elements of the process may be performed in a different order, in parallel, omitted entirely, and the like. Furthermore, the process 300 may include other elements in addition to those presented. For example, the process 300 may include error-handling functions if exceptions occur, and the like.

Referring to FIG. 3, the process 300 may include monitoring the frequency band for the presence of a second radio signal in the frequency band, at 302. The second radio signal may be a priority signal, that is, a signal having priority over the UWB signal. The priority may be established by any means. For example, the priority signal may be a radar altimeter signal, and the priority may be established by legislation and/or regulation.

Responsive to the second radio signal not being present in the frequency band, at 304, the process 300 may include transmitting the UWB signal in the frequency band, at 306. The process 300 may continue with monitoring the frequency band for the presence of a second radio signal in the frequency band, at 302.

Alternatively, responsive to the second radio signal being present in the frequency band, at 304, the process 300 may include not transmitting the UWB signal in the frequency band, at 308. The process 300 may continue with monitoring the frequency band for the presence of a second radio signal in the frequency band, at 302.

Controlling transmission of the UWB signal may be accomplished in any suitable manner. For example, one or more components of the UWB radio may be powered down. As another example, a switch between the UWB radio and the antenna may be opened.

Figure 4:
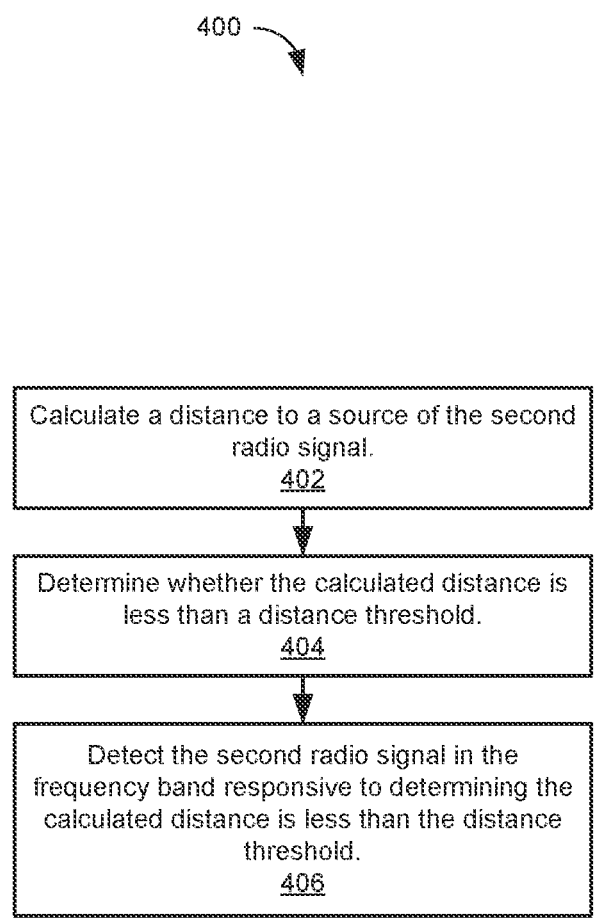
FIG. 4 is a flowchart illustrating a process for detecting the presence of a second radio signal in the frequency band of a UWB radio based on distance according to some embodiments of the disclosed technologies.

FIG. 4 is a flowchart illustrating a process 400 for detecting the presence of a second radio signal in the frequency band of a UWB radio based on distance according to some embodiments of the disclosed technologies. The elements of the process 400 are presented in one arrangement. However, it should be understood that one or more elements of the process may be performed in a different order, in parallel, omitted entirely, and the like. Furthermore, the process 400 may include other elements in addition to those presented. For example, the process 400 may include error-handling functions if exceptions occur, and the like.

Referring to FIG. 4, the process 400 may include calculating a distance to a source of the second radio signal, at 402. For example, referring again to FIG. 2, the controller may determine the distance based on parameters passed by the detect circuit 220. The distance may be, for example, a distance between the source and the antenna 202 of the UWB radio system 200.

Referring again to FIG. 4, the process 400 may include determining whether the calculated distance is less than a distance threshold, at 404. The distance threshold may be selected by any means. For example, the distance threshold may be set according to laws and/or regulations. In one example, the United States Federal Communications Commission has set the distance threshold at 160 feet.

The process 400 may include detecting the second radio signal in the frequency band responsive to determining the calculated distance is less than the distance threshold, at 406.

Figure 5:
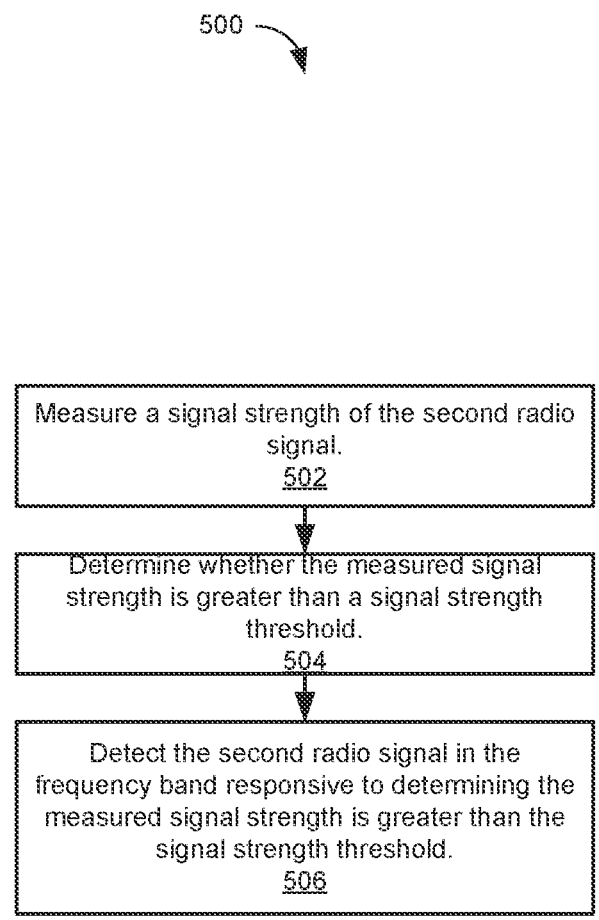
FIG. 5 is an example computing component that may be used to implement various features of embodiments described in the present disclosure.

FIG. 5 is a flowchart illustrating a process 500 for detecting the presence of a second radio signal in the frequency band of a UWB radio based on signal strength according to some embodiments of the disclosed technologies. The elements of the process 500 are presented in one arrangement. However, it should be understood that one or more elements of the process may be performed in a different order, in parallel, omitted entirely, and the like. Furthermore, the process 500 may include other elements in addition to those presented. For example, the process 500 may include error-handling functions if exceptions occur, and the like.

Referring to FIG. 5, the process 500 may include measuring a signal strength of the second radio signal, at 502. For example, referring again to FIG. 2, the controller may determine the signal strength based on parameters passed by the detect circuit 220.

Referring again to FIG. 5, the process 500 may include determining whether the measured signal strength is greater than a signal strength threshold, at 504. The signal strength threshold may be selected by any means. For example, the signal strength threshold may be set according to laws and/or regulations. In one example, the United States Federal Communications Commission has set the signal strength threshold at −70 dBm.

The process 500 may include detecting the second radio signal in the frequency band responsive to determining the measured signal strength is greater than the signal strength threshold, at 506.

Example calculations are presented below for an embodiment where the priority signal is a radar altimeter signal, the distance threshold is 160 feet, and the signal strength threshold is −70 dBm. However, it should be understood by those skilled in the relevant arts that other calculations and values may be used.

In this example, the power of the radar altimeter signal is given in mw by equation (1), and in dBm by equation (2).

$$\text{Heli\_Pow\_mw}:=600 \text{ mw} \tag{1}$$

$$\text{Heli\_Pow}:=10\cdot\log(\text{Heli\_Pow\_mw})=27.782 \text{ dBm} \tag{2}$$

The distance threshold is given by equation (3).

$$\text{Distance}:=160 \text{ feet} \tag{3}$$

The expected power loss of the radar altimeter signal over this distance is given by equation (4).

$$\text{PL}:=20\cdot\log(4300)+20\cdot\log(\text{Distance}/3.28)- \\ 27.6=78.834 \text{ dBm} \tag{4}$$

The expected power loss of the antenna of the UWB system is given by equation (5).

$$\text{Ant\_Loss\_Vert}:=10 \text{ dBm} \tag{5}$$

The detected power of the radar altimeter signal by the detect circuit of the UWB system is given by equation (6).

$$Dect\_Pow := Heli\_Pow - PL - Ant\_Loss\_Vert = -61.053 \text{ dBm} \quad (6)$$

The noise figure and signal-to-noise ratio of the detect circuit of the UWB system are estimated in equations (7) and (8).

$$DAA\_NF := 10 \text{ dBm} \quad (7)$$

$$SNR := 10 \text{ dBm} \quad (8)$$

The thermal noise, also known as Johnson noise, is given by equation (9).

$$JN := -174 \text{ dBm} \quad (9)$$

The noise bandwidth for a 200 Mhz bandwidth is given by equation (10).

$$NB := 10 \cdot \log(200 \cdot 10^6) \quad (10)$$

The sensitivity of the detect circuit of the UWB system is given by equation (11).

$$DAA\_Sen = JN + DAA\_NF + SNR + NB = -70.99 \text{ dBm} \quad (11)$$

The resulting margin of the detect circuit of the UWB system is given by equation (12).

$$Margin := Dect\_Pow - DAA\_Sen = 9.937 \text{ dBm} \quad (12)$$

Figure 6:
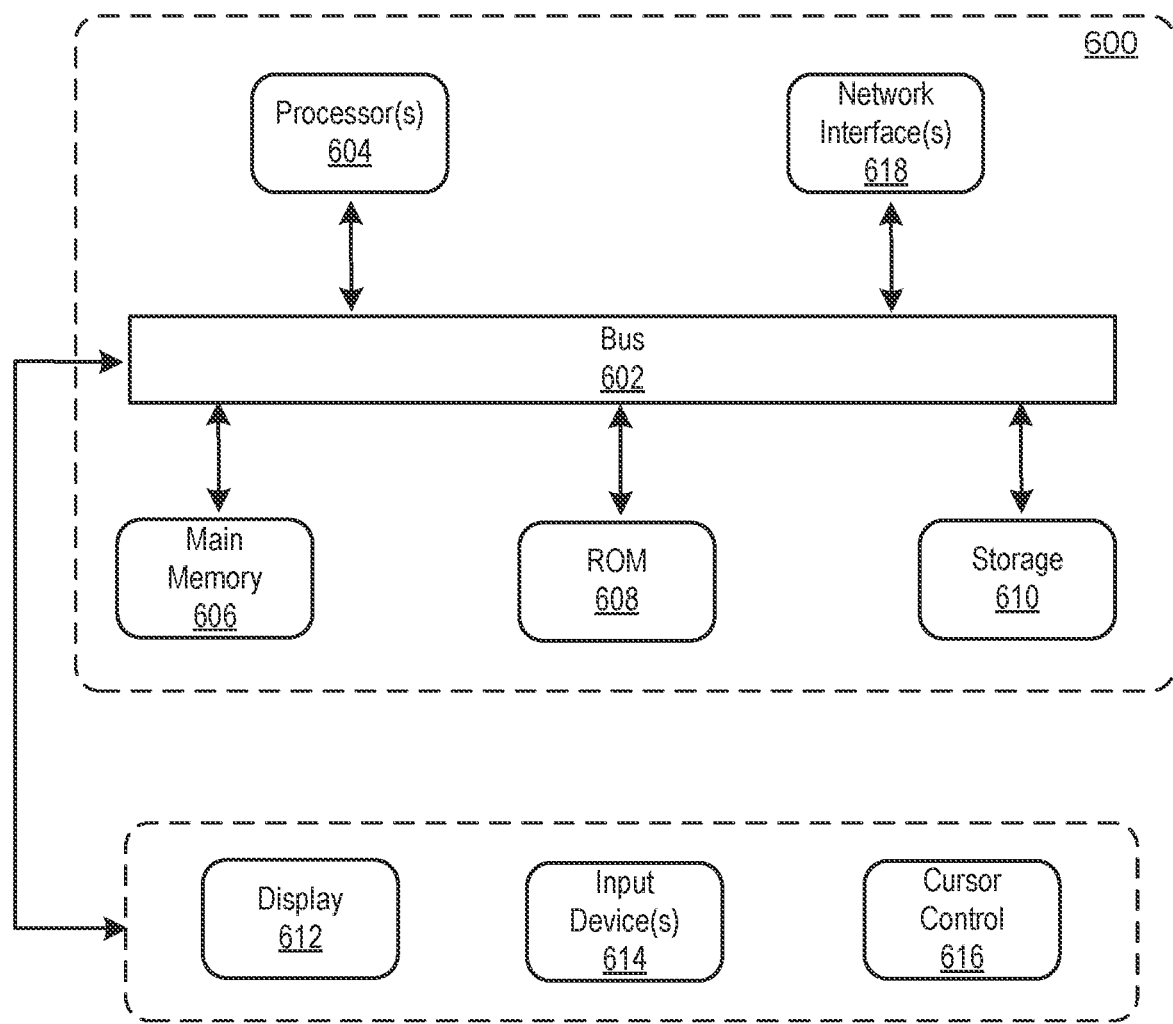
FIG. 6 depicts a block diagram of an example computer system in which embodiments described herein may be implemented.

FIG. 6 depicts a block diagram of an example computer system 600 in which embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or a WAN component to communicate with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An apparatus comprising:
   an ultra-wideband (UWB) radio configured to transmit a UWB radio signal in a UWB frequency band;
   a detect circuit configured to:
      monitor the UWB frequency band for a presence of a radio altimeter signal in the UWB frequency band, and
      responsive to detecting the presence of a radio altimeter signal in the UWB frequency band, generate one or more parameters based on the radio altimeter signal and transmit the one or more parameters; and
   a controller configured to:
      receive the one or more parameters,
      responsive to receiving the one or more parameters, calculate a distance to a source of the radio altimeter signal based on the one or more parameters, and determine whether the calculated distance is less than a distance threshold, responsive to determining the calculated distance is less than the distance threshold, cause the UWB radio not to transmit the UWB signal; and responsive to not detecting the radio altimeter signal in the UWB frequency band, cause the UWB radio to transmit the UWB signal.

2. The apparatus of claim 1, wherein the controller is configured to calculate a distance to a source of the radio altimeter signal by:

measuring a signal strength of the radio altimeter signal; and determining whether the measured signal strength is greater than a signal strength threshold.

3. The apparatus of claim 1, wherein:

the radio altimeter signal is in the 4.2-4.4 GHz frequency band.

4. The apparatus of claim 1, further comprising:

an antenna; and a directional coupler electrically coupled to the antenna, the UWB radio, and the detect circuit.

5. A method comprising:

monitoring an ultra-wideband (UWB) frequency band for a presence of a radio altimeter signal in the UWB frequency band;

responsive to detecting the presence of a radio altimeter signal in the UWB frequency band, generating one or more parameters based on the radio altimeter signal;

calculating a distance to a source of the radio altimeter signal based on the one or more parameters;

determining whether the calculated distance is less than a distance threshold;

transmitting a UWB radio signal in the UWB frequency band only when the calculated distance is not less than the distance threshold and responsive to not detecting the radio altimeter signal in the UWB frequency band, resuming transmission of the UWB signal.

6. The method of claim 5, wherein calculating a distance to a source of the radio altimeter signal comprises:

measuring a signal strength of the radio altimeter signal; and determining whether the measured signal strength is greater than a signal strength threshold.

7. The method of claim 5, wherein:

the radio altimeter signal is in the 4.2-4.4 GHz frequency band.

8. A non-transitory machine-readable storage medium encoded with instructions executable by one or more hardware processors of a computing component, the machine-readable storage medium comprising instructions to cause the one or more hardware processors to perform operations comprising:

receiving one or more parameters of signals received in an ultra-wideband (UWB) frequency band of a UWB radio;

monitoring the UWB frequency band for a presence of a radio altimeter signal based on the received parameters;

responsive to detecting the presence of a radio altimeter signal in the UWB frequency band, calculating a distance to a source of the radio altimeter signal based on the one or more parameters;

determining whether the calculated distance is less than a distance threshold;

transmitting UWB radio signal in the UWB frequency band only when the calculated distance is not less than the distance threshold; and responsive to not detecting the radio altimeter signal in the UWB frequency band, causing transmission of the UWB signal to resume.

9. The non-transitory machine-readable storage medium of claim 8, wherein calculating a distance to a source of the radio altimeter signal comprises:

measuring a signal strength of the radio altimeter signal; and determining whether the measured signal strength is greater than a signal strength threshold.

10. The non-transitory machine-readable storage medium of claim 1, wherein:

the radio altimeter signal is in the 4.2-4.4 GHz frequency band.

11. An apparatus comprising:

an ultra-wideband (UWB) radio configured to transmit a UWB radio signal in a UWB frequency band;

a detect circuit;

an antenna; and a directional coupler electrically coupled to the antenna, the UWB radio, and the detect circuit;

wherein the detect circuit is configured to:

monitor the UWB frequency band for a presence of a radio altimeter signal in the UWB frequency band, and responsive to detecting the presence of a radio altimeter signal in the UWB frequency band, generate one or more parameters based on the radio altimeter signal and transmit the one or more parameters; and a controller configured to:

receive the one or more parameters, responsive to receiving the one or more parameters, calculate a distance to a source of the radio altimeter signal based on the one or more parameters, and determine whether the calculated distance is less than a distance threshold, and responsive to determining the calculated distance is less than the distance threshold, cause the UWB radio not to transmit the UWB signal.

12. The apparatus of claim 11, wherein the controller is configured to calculate a distance to a source of the radio altimeter signal by:

measuring a signal strength of the radio altimeter signal; and determining whether the measured signal strength is greater than a signal strength threshold.

13. The apparatus of claim 11, the operations further comprising:

responsive to not detecting the radio altimeter signal in the UWB frequency band, causing the UWB radio to transmit the UWB signal.

14. The apparatus of claim 11, wherein:

the radio altimeter signal is in the 4.2-4.4 GHz frequency band.

* * * * *